(No Model.)

A. VAN BERKEL & R. FLIESS.
PROCESS OF AND APPARATUS FOR MAKING CARBONIC ACID.

No. 513,691. Patented Jan. 30, 1894.

WITNESSES:
Charles Schroeter
Adolph Scherer

INVENTORS
Adrian Van Berkel
and Rudolf Fliess
BY
Gorpue Raegener
ATTORNEYS.

THE NATIONAL LITHOGRAPHING COMPANY.
WASHINGTON, D. C.

UNITED STATES PATENT OFFICE.

ADRIAN VAN BERKEL, OF BERLIN, AND RUDOLF FLIESS, OF WRIETZEN, GERMANY, ASSIGNORS TO SAID BERKEL, AND CHARLES W. SCHNEIDER, OF ROSEHOOK, NEW YORK.

PROCESS OF AND APPARATUS FOR MAKING CARBONIC ACID.

SPECIFICATION forming part of Letters Patent No. 513,691, dated January 30, 1894.

Application filed May 4, 1893. Serial No. 473,032. (No model.)

*To all whom it may concern:*

Be it known that we, ADRIAN VAN BERKEL, a subject of the Queen of the Netherlands, residing in Berlin, and RUDOLF FLIESS, a subject of the German Emperor, residing in Wrietzen, on-the-Oder, in the Kingdom of Prussia and Empire of Germany, have invented certain new and useful Improvements in Processes of and Apparatus for Producing Carbonic Acid from Carbonates by Heat, of which the following is a specification.

This invention relates to an improved process of and apparatus for producing carbonic acid gas from mineral carbonates by subjecting them to the action of heat, by which an increased yield of carbonic acid is obtained.

Heretofore mineral carbonates were subjected in closed retorts, with or without mechanical stirring devices, to the action of heat, so as to separate the carbonic acid gas contained in the same. The systems heretofore in use failed to overcome fully the disinclination of the carbonic acid gas to separate itself from its mineral combinations, which defect was furthermore aggravated by the fact that the liberated carbonic acid settled above the minerals being treated and retarded thereby the further generation of the carbonic acid from the same. The process therefor involved a considerable prolongation of the heating operation and caused a larger consumption of fuel. For the purpose of obviating these objections, we have devised a new process of and apparatus for treating mineral carbonates for the purpose of producing carbonic acid gas, and our invention consists, first, in a process of extracting carbonic acid from mineral carbonates by subjecting the same to heat and to an elevating and dropping movement as hereinafter described and claimed, and also simultaneously drawing off the carbonic acid gas yielded during said operation.

The invention consists, secondly, of an apparatus for producing carbonic acid from mineral carbonates, which comprises a rotary drum for receiving said carbonates, said drum being heated by a suitable furnace provided with a grate and provided with means whereby the carbonates are intermittently lifted and dropped during the rotation of the drum and means for drawing off the gas developed in the drum.

Figure 2:
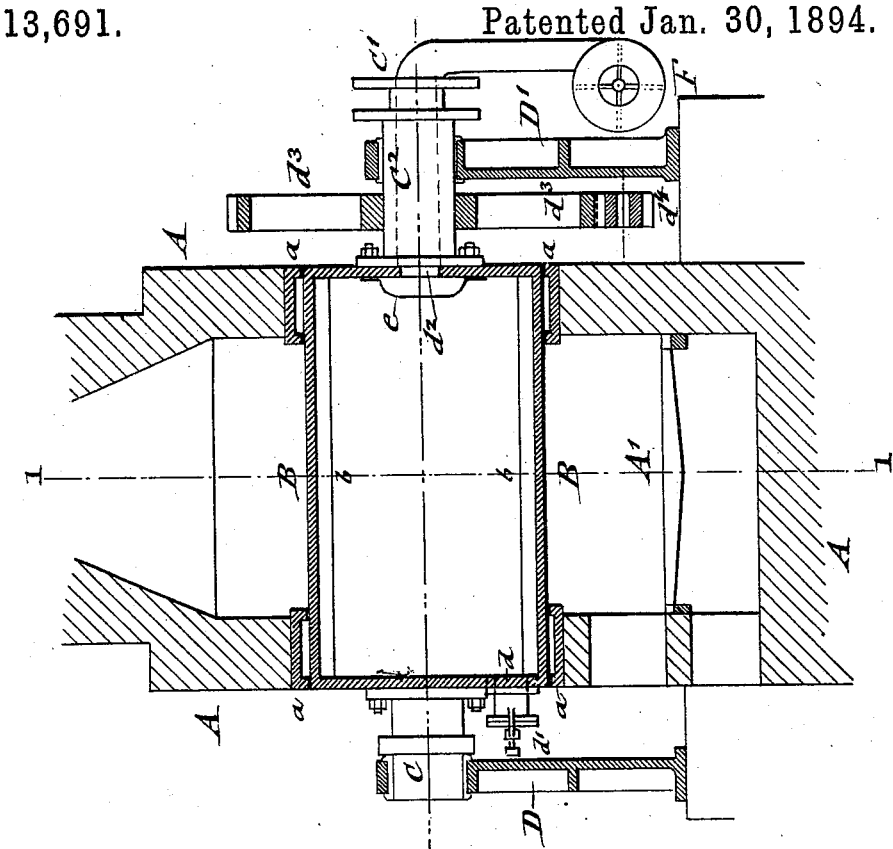
Figure 1:
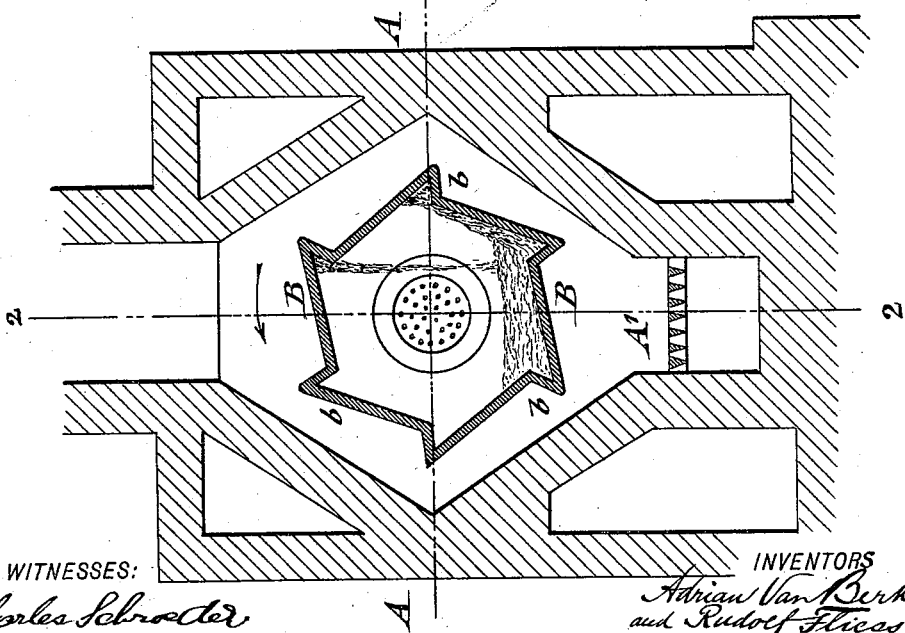

In the accompanying drawings, Figure 1 represents a vertical transverse section on line 1, 1, Fig. 2, and Fig. 2 is a vertical longitudinal section on line 2 2, Fig. 1 of my improved apparatus for producing carbonic acid gas from mineral carbonates.

Similar letters of reference indicate corresponding parts.

Referring to the drawings A represents a furnace which is built of fire-brick or other suitable material, and which is provided at its lower part with a grate A' on which the fuel by which the furnace is heated is burned.

In the walls of the furnace A are arranged suitable bearings $a$ in which is guided a rotary drum B which is charged with mineral carbonates. This drum is preferably constructed with a polyangular periphery in which angular buckets $b$ are formed, as shown in Fig. 1, which serve for the purpose of intermittently raising the carbonates during the rotation of the drum until they arrive at a certain height, when they are dropped so as to pass through the heated interior space of the drum, whereby they are brought successively into contact with the highly-heated inner surfaces of the drum. During the dropping of the carbonates through the highly-heated space in the drum, the carbonic acid gas is separated more easily from the mineral carbonates, and is continually kept in motion and prevented from settling on the minerals. It is obvious that the drum can be also made cylindrical provided that inwardly projecting flanges or buckets are arranged, by which the before described intermittent lifting and dropping of the mineral carbonates is produced.

One head of the drum is provided with a manhole $d$ that is closed by a suitable manhole-cover $d'$ for charging and discharging the drum. To the same head is applied a shaft C while an opening $d^2$ in the opposite head is connected with a hollow shaft C' that turns in a suitable stuffing box C², the shaft C C' being supported in bearings of suitable standards D D'. A perforated guard plate or screen *e* is arranged at the mouth of the hollow shaft C' so as to prevent the dropping of some of the minerals into the shaft. To the hollow shaft C' is applied a gear-wheel $d^3$ which meshes with a pinion $d^4$ to which rotary motion is imparted which motion is transmitted by the gear-wheel to the drum. The hollow shaft C' is connected with a suction-fan or draft device F by which the carbonic acid gas is continuously drawn off from the interior of the retort.

The process of generating carbonic acid gas from the mineral carbonates is as follows: The carbonates are charged into the drum and the drum then slowly rotated and subjected to the fire of the furnace A. During the rotation of the drum, the carbonates are lifted by the buckets of the same and dropped successively through the highly-heated space in the drum, whereby the carbonates are kept continually in motion, so that they give off more freely the carbonic acid contained in the same under the influence of the heat at the interior of the drum. By the suction-fan connected with the hollow shaft C' the carbonic acid gas generated in the drum is continually drawn off, so that new gas can immediately take its place.

By our improved apparatus or retort for heating mineral carbonates, a high yield of pure carbonic acid is obtained, while at the same time the carbonates are not over-burned but obtained in such a condition that they form, instead of a waste residue a very valuable material for making artificial stones and building plates.

Having thus described our invention, we claim as new and desire to secure by Letters Patent—

1. The process of separating carbonic acid from mineral carbonates, which consists in subjecting the entire mass of carbonates to a continuous elevating and dropping movement under the action of heat, portions of the carbonates being elevated while other portions are being dropped, substantially as set forth.

2. In an apparatus for separating carbonic acid from mineral carbonates, the combination of a furnace, a rotary closed retort disposed in said furnace and provided with means on its interior for elevating and dropping the mineral carbonates during its rotation, a draft device and a pipe connecting said draft device with said retort for drawing off the gas developed in said retort.

3. In an apparatus for separating carbonic acid from mineral carbonates, the combination of a furnace, a rotary closed retort disposed therein for containing the mineral carbonates, said retort being provided with buckets on its interior for continuously elevating and dropping said carbonates during the heating operation, a hollow shaft for supporting said drum, and a draft device connected with said shaft, for drawing off the gas therefrom.

4. In an apparatus for separating carbonic acid from mineral carbonates, the combination of a furnace, a rotary closed retort disposed therein for containing the mineral carbonate, said retort being provided with buckets on its interior for continuously elevating and dropping said carbonate during the heating operation, a hollow shaft for supporting said retort, and a draft device connected with said shaft for drawing off the gas therefrom, said retort being provided with a transverse screen on its interior over the mouth of said hollow shaft.

5. In an apparatus for separating carbonic acid from mineral carbonates, the combination of a furnace, a rotary closed retort disposed therein for containing the mineral carbonate, said retort having a polyangular periphery provided with buckets at its angles, one side of each bucket being a continuation of the face plate of the retort and the other side being formed by an outwardly projecting flange of the adjacent plate, and a draft device connected with said retort, substantially as set forth.

In testimony that we claim the foregoing as our invention we have signed our names in presence of two subscribing witnesses.

ADRIAN VAN BERKEL.
RUDOLF FLIESS.

Witnesses:
ISIDOR JACOBSOHN,
ED. RESOHERS.